Figure 1:
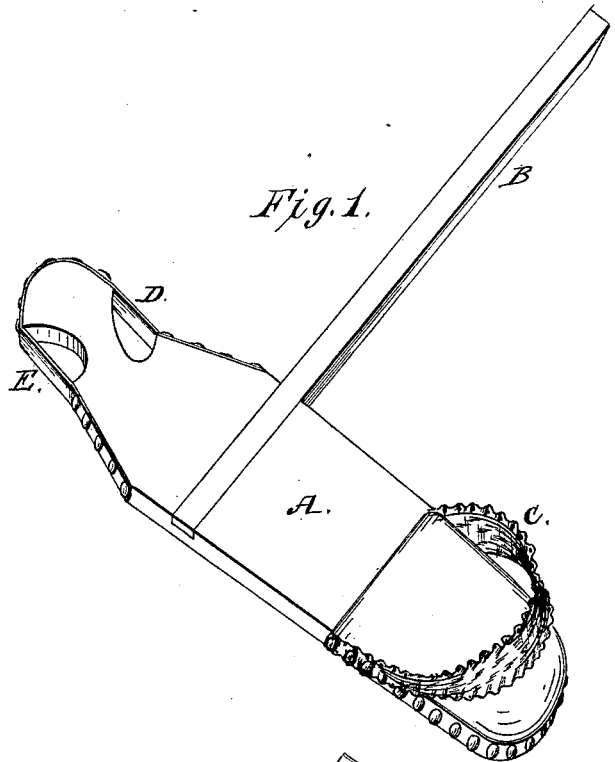
Figure 2:
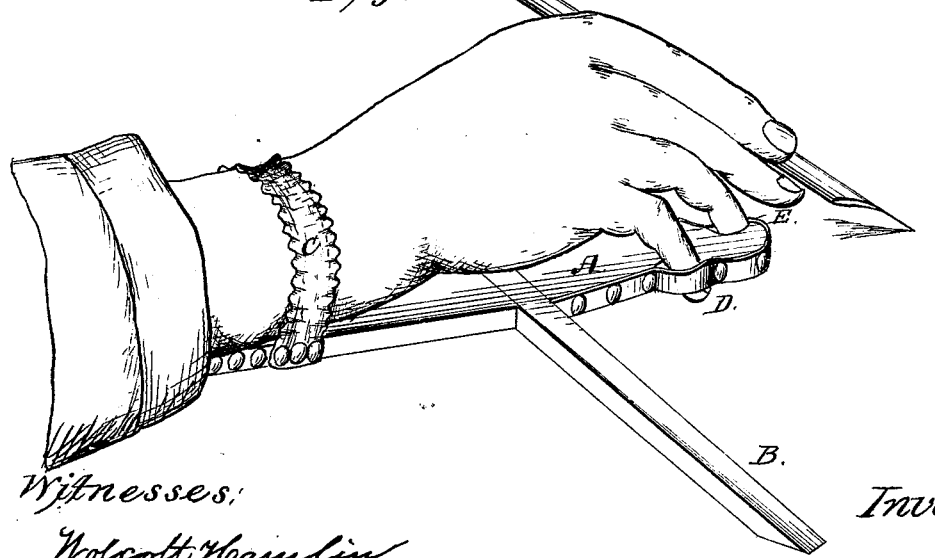

J. D. TAYLOR.
DEVICE FOR TEACHING PENMANSHIP.

No. 188,984. Patented March 27, 1877.

Witnesses:
Wolcott Hamlin
John A. Conant

Inventor,
John D. Taylor

UNITED STATES PATENT OFFICE.

JOHN D. TAYLOR, OF WILLINGTON, CONNECTICUT.

IMPROVEMENT IN DEVICES FOR TEACHING PENMANSHIP.

Specification forming part of Letters Patent No. 188,984, dated March 27, 1877; application filed January 10, 1877.

*To all whom it may concern:*

Be it known that I, JOHN D. TAYLOR, of Willington, in the county of Tolland and State of Connecticut, have invented a certain new and original Machine or Implement, of which the following is a specification:

This invention consists of a thin suitably-shaped piece of board, or other equivalent material, to be attached at one end to the under side of the hand or wrist by an elastic band, or other suitable fastening, and at the other end to be attached in like manner to the third and fourth fingers of the hand, so as to confine these fingers, leaving the first and second fingers at liberty, the whole machine or implement moving freely with the hand.

The object of the invention is to compel persons learning to write to keep the hand and fingers in proper position relatively to the paper; and, also, to compel the holding of the pen by the proper fingers only, and in a proper manner and position for writing; also, to give greater steadiness to the hand while learning to write.

The drawing is a vertical two thirds size view of a machine embodying my invention.

A is the bed-piece, which may be made of any kind of thin board, or other equivalent material, formed substantially as appears. B is a lateral extension of the bed-piece, to give greater steadiness and proper position to the hand when the machine is used. C is an elastic band to confine the bed-piece to the hand or wrist. D and E are similar pieces of elastic band, to confine the third and fourth fingers of the writing-hand.

I am aware that a hand-rest with finger-loops is not new, broadly; but

What I claim as my invention is—

The mechanical aid to penmanship herein described, consisting of the bed-piece A, provided with the lateral extension B, and having the elastic wrist and finger-bands C D E, all constructed and arranged as set forth.

JOHN D. TAYLOR.

Witnesses:
WOLCOTT HAMLIN,
JOHN A. CONANT.